US009868510B2

United States Patent
Pereira Mosqueira et al.

(10) Patent No.: US 9,868,510 B2
(45) Date of Patent: Jan. 16, 2018

(54) AIRCRAFT CONTROL SURFACE

(71) Applicant: Airbus Operations S.L., Getafe (ES)

(72) Inventors: Fernando Pereira Mosqueira, Getafe (ES); Enrique Guinaldo Fernandez, Getafe (ES); Carlos Garcia Nieto, Getafe (ES); Francisco Javier Honorato Ruiz, Getafe (ES); Andrea Ivan Marasco, Getafe (ES); Francisco José Cruz Dominguez, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 98 days.

(21) Appl. No.: 14/580,456

(22) Filed: Dec. 23, 2014

(65) Prior Publication Data

US 2015/0197328 A1   Jul. 16, 2015

(30) Foreign Application Priority Data

Dec. 23, 2013   (EP) .................................. 13382544

(51) Int. Cl.
*B64C 9/02* (2006.01)
*B64C 5/02* (2006.01)
(Continued)

(52) U.S. Cl.
CPC ............... *B64C 9/02* (2013.01); *B64C 3/185* (2013.01); *B64C 3/187* (2013.01); *B64C 5/02* (2013.01);
(Continued)

(58) Field of Classification Search
CPC .. B64C 3/18; B64C 3/187; B64C 9/02; B64C 9/16; B64C 9/22; B64C 9/00; B64C 3/185; B64C 5/02
See application file for complete search history.

(56) References Cited

U.S. PATENT DOCUMENTS 1,775,386 A * 9/1930 Blondin .................... B64C 3/00
244/123.4
1,827,181 A * 10/1931 Alfaro ...................... B64C 3/00
244/117 R
(Continued)

FOREIGN PATENT DOCUMENTS

EP   2636593 A1   11/2013

OTHER PUBLICATIONS

Google, "define spar"; https://www.google.com/search?q=define+spar; accessed Apr. 24, 2017.*
(Continued)

*Primary Examiner* — Tien Q Dinh
*Assistant Examiner* — Alexander V. Giczy
(74) *Attorney, Agent, or Firm* — Greer Burns & Crain, Ltd.

(57) ABSTRACT

A structure of a control surface for aircrafts, such as elevators, rudders, landing flaps, ailerons, and other similar lifting surfaces. The control surface includes a front spar, a rear spar, a plurality of ribs, at least one hinge fitting, and at least one actuator fitting, the hinge and actuator fittings joined with the front spar. A first rib is joined with a hinge fitting to form a first oblique angle with the front spar; a second rib is joined with an actuator fitting to form a second oblique angle with the front spar. The rear spar, located between the front spar and trailing edge of the control surface, extends only between the second rib and an outboard end of the control surface. The ribs are located in correspondence with the main torsion and bending load paths created in the control surface during flight, landing or takeoff.

18 Claims, 5 Drawing Sheets

(51) Int. Cl.
  *B64C 3/18* (2006.01)
  *B64C 9/00* (2006.01)

(52) U.S. Cl.
  CPC .......... *B64C 9/00* (2013.01); *B64C 2009/005* (2013.01); *Y02T 50/44* (2013.01)

(56) References Cited

U.S. PATENT DOCUMENTS

| | | | | |
|---|---|---|---|---|
| 1,992,560 | A * | 2/1935 | Welman | B64C 3/00 244/123.8 |
| 2,362,033 | A | 11/1944 | Snyder | |
| 2,386,170 | A * | 10/1945 | Watter | B64C 9/02 244/123.1 |
| 2,540,335 | A | 2/1951 | Johnson | |
| 2,963,094 | A * | 12/1960 | Cantinieau | B64C 27/473 416/226 |
| 4,471,927 | A * | 9/1984 | Rudolph | B64C 9/16 244/215 |
| 4,667,905 | A * | 5/1987 | Hamm | B64C 3/20 244/123.13 |
| 5,098,043 | A * | 3/1992 | Arena | B64C 13/26 244/215 |
| 6,234,423 | B1 * | 5/2001 | Hirahara | B64C 3/18 244/123.7 |
| 2006/0118675 | A1 * | 6/2006 | Tidwell | B64C 3/40 244/123.1 |
| 2009/0072090 | A1 * | 3/2009 | Kallinen | B64C 9/02 244/131 |
| 2009/0146016 | A1 * | 6/2009 | Kordel | B64C 9/02 244/215 |
| 2009/0308981 | A1 * | 12/2009 | McAlinden | B64C 9/02 244/213 |
| 2012/0034093 | A1 * | 2/2012 | Vertel | B64C 3/187 416/229 R |
| 2013/0185918 | A1 * | 7/2013 | Yamane | B23P 19/10 29/464 |
| 2013/0302172 | A1 * | 11/2013 | Williams | B64C 3/22 416/227 R |
| 2014/0048652 | A1 * | 2/2014 | Honorato Ruiz | B29C 70/42 244/123.1 |
| 2016/0325822 | A1 * | 11/2016 | Mosqueira | B64C 3/18 |

OTHER PUBLICATIONS

Extended European Search Report for EP Patent Application No. 13382544.8, dated May 30, 2014.

* cited by examiner

AIRCRAFT CONTROL SURFACE

CROSS-REFERENCES TO RELATED APPLICATION

This application claims the benefit of European Patent Application No. 13382544.8 filed on Dec. 23, 2013, the entire contents of which are hereby incorporated herein by reference.

BACKGROUND OF THE INVENTION

The present invention refers in general to control surfaces for aircraft, such as elevators, rudders, landing flaps, ailerons, and other similar lifting surfaces.

It is an object of the present invention to provide an optimized structure for an aircraft control surface, in order to reduce the weight of the control surface, thus, reducing fuel consumption.

Additionally, it is also an object of the present invention to provide a control surface for an aircraft which can be easily maintained, and manufactured with a reduced number of components, in order to simplify its assembly and manufacturing process.

Aircraft are provided with different types of movable lifting or control surfaces which are used for maneuvering the aircraft during flight, take-off and landing.

Typically, these control surfaces are formed by panels supported by an internal structure, which is hinged to the aircraft at its leading edge, so that the control surface is pivoted around the hinges by actuators. Due to the large area of some of these controls surfaces, and due to the high speeds that an aircraft like a commercial one reaches during flight, these control surfaces must support high torsion and bending loads.

Elevators are control surfaces placed on both sides of the Horizontal Tail Plane (HTP) of an aircraft, and they are used to control the pitch of the aircraft. Similarly to the case of the torsion box, elevators are mainly multi-rib structures made of composite materials, formed by at least a main spar, and a plurality of ribs supporting upper and lower panels.

Elevators are usually constructed as one assembly although in very large commercial aircraft, they are split in two different sub-assemblies, inboard and outboard elevators. Similarly, in the case of rudders for large aircraft, the same concept is applied to the rudder design, with upper and lower rudders.

Figure 1:
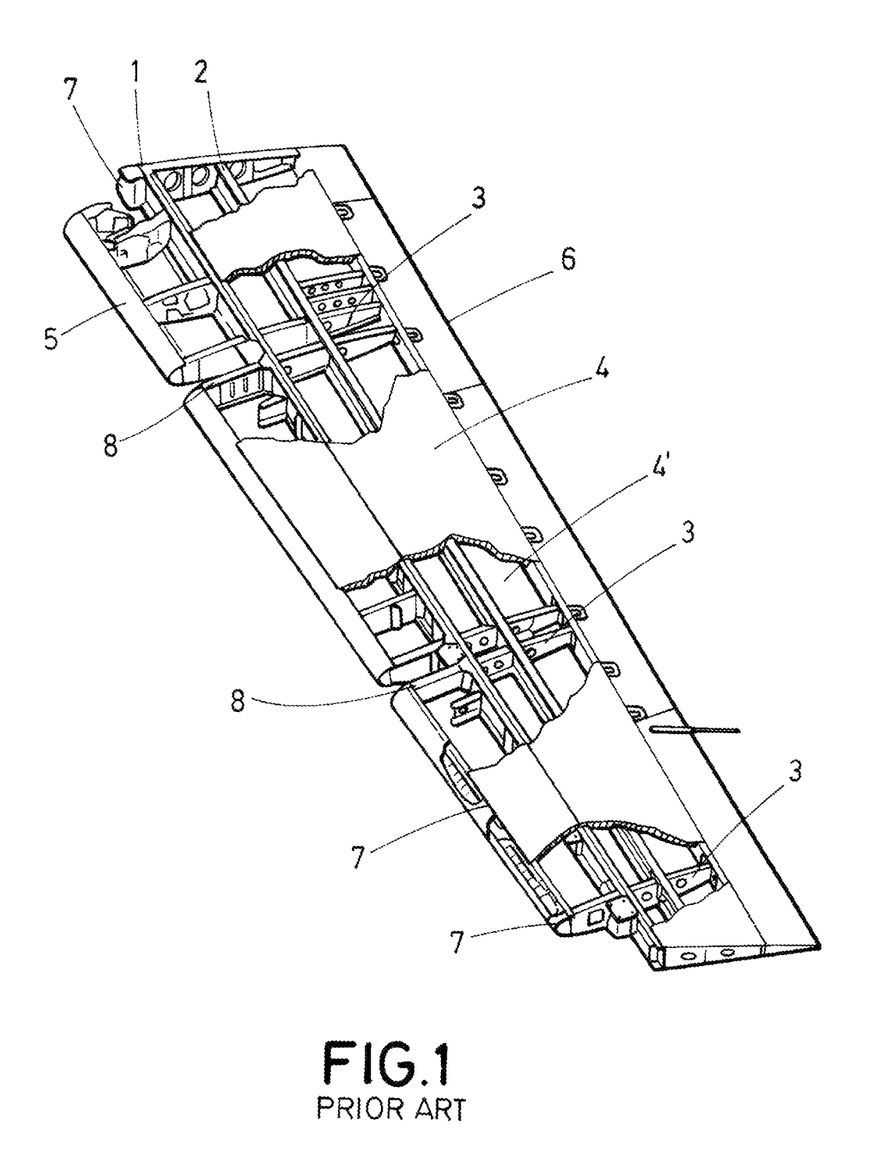
FIG. 1 shows a perspective view of an elevator of the prior art, wherein the upper panel is partially removed.

FIG. 1 shows a conventional honeycomb panel structure for an elevator which includes a front spar (1) located near the leading edge (5), a rear spar (2) closer to the trailing edge (6), a plurality of ribs (3) joined to the front spar, and upper and lower panels (4,4') supported by said spars and ribs. The traditional orthogonal arrangement of the ribs with respect to the front spar can be seen in FIG. 1.

The elevator is provided with several hinge fittings (7) at the leading edge (5) for creating a pivoting connection between the elevator and the lateral torsion box of an HTP. Several actuator fittings (8) are also provided at the leading edge for connecting actuators (not shown) such as hydraulic cylinders. The elevator ribs typically have one end joined with an actuator or with a hinge fitting.

Some traditional control surfaces structures are formed by spars and ribs.

Figure 2A:
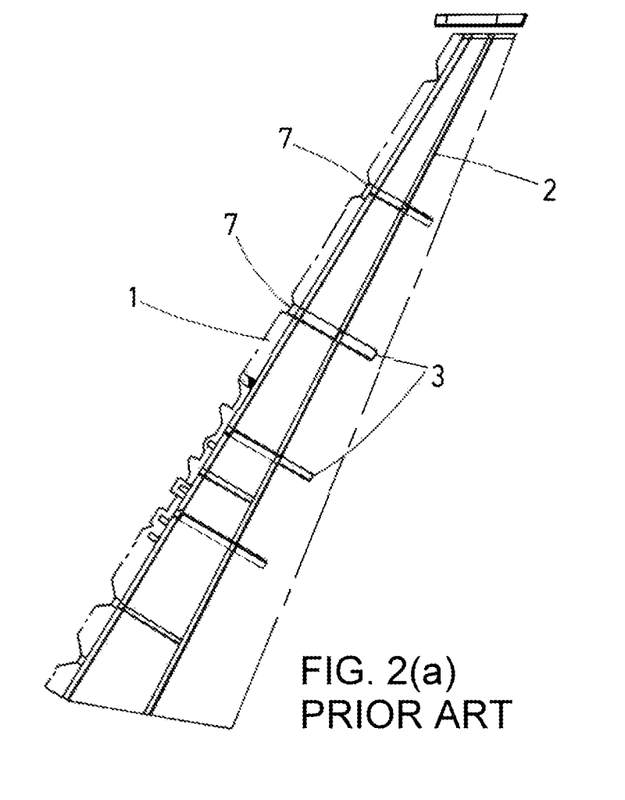
FIGS. 2(a) and 2(b) show: in the drawing of FIG. 2(a) an elevation view of a rudder internal structure according to the prior art, and in the drawing of FIG. 2(b) a cross-sectional view of the rudder of FIG. 2(a).
Figure 2B:
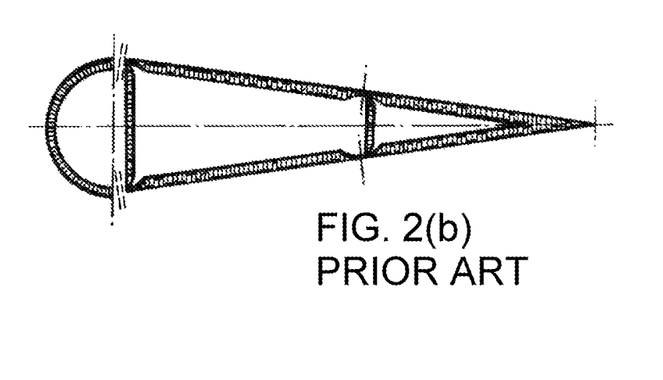
Figure 3:
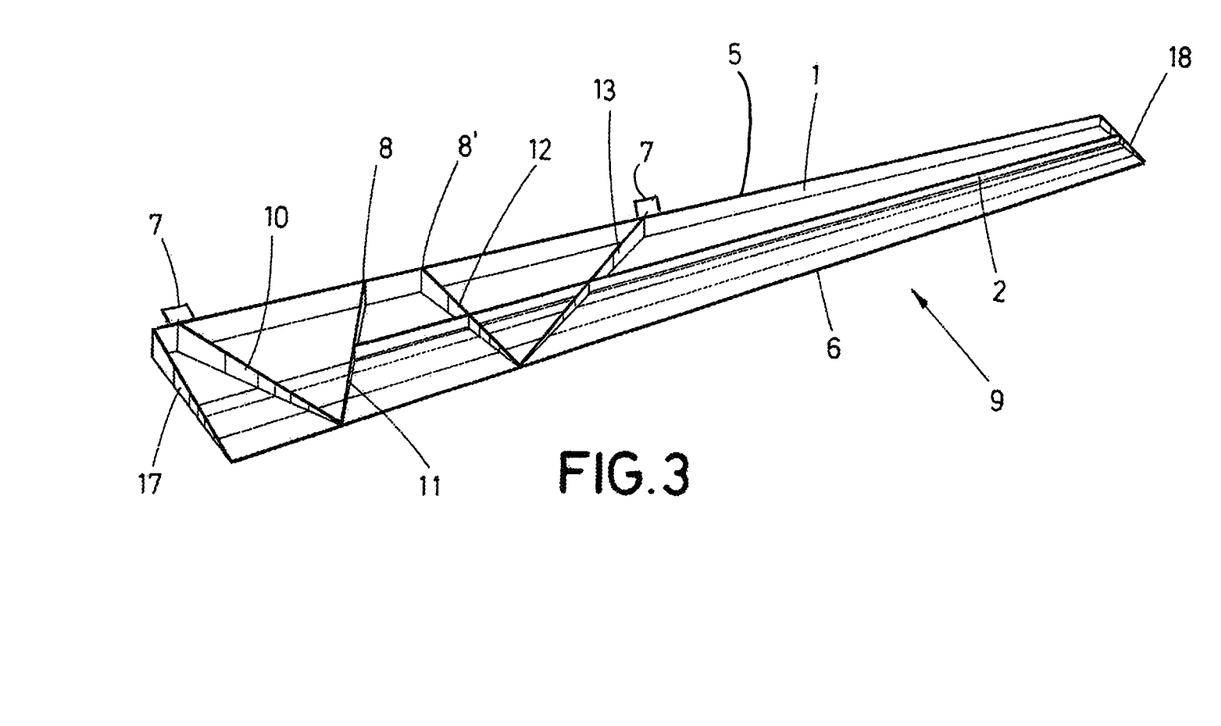
FIG. 3 shows a schematic representation of a perspective view of a control surface structure according to the invention, wherein the upper panel is not shown for sake of clarity of the illustration.

FIGS. 2(a) and 2(b) show a known multi-rib architecture for a rudder, formed by two spars (1,2), a set of ribs (3) and cover panels, all of them made of honeycomb sandwiched material, as shown in FIG. 2(b).

Most control surface structures of the prior art are non-monolithic structures, since they are constructed using sandwiched panels formed by a honeycomb core with Carbon Fiber Reinforced Plastic (CFRP) face sheets as surface panels. It is known that honeycomb sandwiched panels are difficult to repair and suffer from water ingestion during flight.

Another known structure for control surfaces, especially for flaps, is the composite multi-spar architecture, which can be an option over traditional multi-rib structures, with the aim of both weight and cost reduction. A multi-spar structure is formed only by spars and cover panels, so that the ribs are replaced by a number of spars longitudinally arranged.

SUMMARY OF THE INVENTION

The present invention is based on an architectural optimization of structural elements, namely the layout of spars and stringers of an existing control surface, with the aim of reducing its weight and simplifying the manufacturing method.

Therefore, an aspect of the invention refers to an aircraft control surface which typically comprises a front spar located near the leading edge of the control surface, and at least one hinge fitting joined with said front spar, for creating a pivoting connection between the control surface and the torsion box of the lifting structure. Furthermore, at least one actuator fitting is joined to the front spar, thus allowing a pivoting connection between a device, such as a hydraulic cylinder, and the control surface.

A number of ribs are provided as reinforcing elements of the structure for stabilizing the upper and lower cover panels. The ribs are joined at one of their ends to the front spar at the points at which the actuator fittings are located, as well as at some of the hinge fitting locations.

According to certain embodiments of the present invention, at least one rib is joined or connected to an actuator fitting, and it is arranged so as to define an oblique angle with respect to the front spar. Thus, the rib connected with an actuator fitting forms an angle with respect to the front spar different to 90°.

The ribs are therefore arranged obliquely along the control surface span, and are connected either to an actuator fitting or to a hinge fitting. Furthermore said obliquely arranged ribs are located so that adjacent ribs are oriented in opposite directions to each other.

Additionally, a rear spar is longitudinally arranged and located between the front spar and a trailing edge of the control surface. This rear spar is shorter than the front spar, and it has an outboard end joined with an outboard end of the control surface.

A technical effect obtained from the above described oblique arrangement of one or more ribs is that the ribs are located in correspondence with the main torsion and bending load paths of the control surface during flight, landing or takeoff. This rib layout creates an efficient load path for singular interface points—between the aircraft control surface and the rest of the structure—such as hinge and actuator fittings.

The conventional orthogonal arrangement of the ribs (shown in FIGS. 1 and 2), is replaced in the present invention by an inclined arrangement of the ribs, in such a manner that the position and inclination of the ribs, substantially follow the main load paths which appear at the control surface.

As a consequence, the same or a better structural behavior of the control surface is achieved with a reduced number of components, mainly ribs, compared with prior art monolithic structures with orthogonal reinforcing elements.

Since a control surface according to the invention consists of a reduced number of components, the manufacturing method thereof may be simplified.

Furthermore, the rib arrangement acts as a cover panel stabilizer, so much so that a reduced number of stringers is needed for internally reinforcing the panels resulting in a weight saving.

An additional benefit is the fact that a control surface according to the invention can now be manufactured using only monolithic panels, such as CFRP laminates, therefore, avoiding the use of sandwiched panels with honeycomb core. Since those honeycomb panels are not used the beforementioned water ingestion problems are eliminated, and repair tasks are greatly simplified.

BRIEF DESCRIPTION OF THE DRAWINGS

Preferred embodiments of the invention are henceforth described with reference to the accompanying drawings, in which.

DETAILED DESCRIPTION OF THE PREFERRED EMBODIMENTS

FIG. 3 and FIGS. 4(a)-4(c) show preferred embodiments of aircraft control surfaces (9) according to the invention, in particular an elevator for a Horizontal Tail Plane (HTP) of an aircraft. The control surface (9) comprises a front spar (1) arranged near a leading edge (5) of the control surface (9), several hinge fittings (7) joined with the front spar (1), for pivotally mounting the control surface (9) to the torsion box of an aircraft lifting surface (not shown), so that the control surface can pivot with respect to an HTP.

Two actuator fittings (8,8') are also joined with the front spar (1), for connecting the control surface to each of the actuators (not shown). The control surface also includes a plurality of ribs (10-15) having one of their ends joined to a hinge fitting or an actuator fitting at the front spar.

Figure 4A:
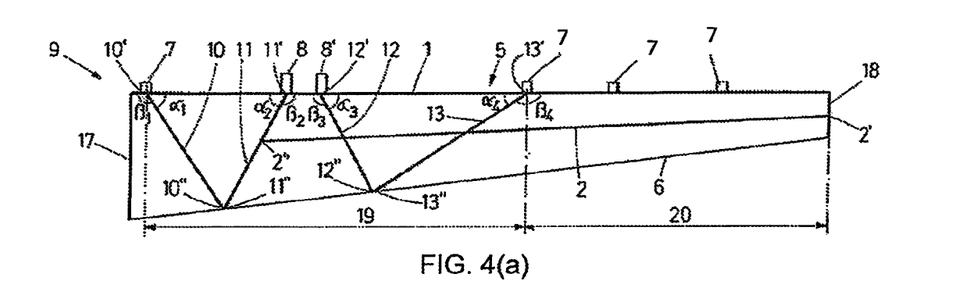
FIGS. 4(a)-4(c) show schematic representations in plan view of three different embodiments of control surface structures according to the invention.
Figure 4B:
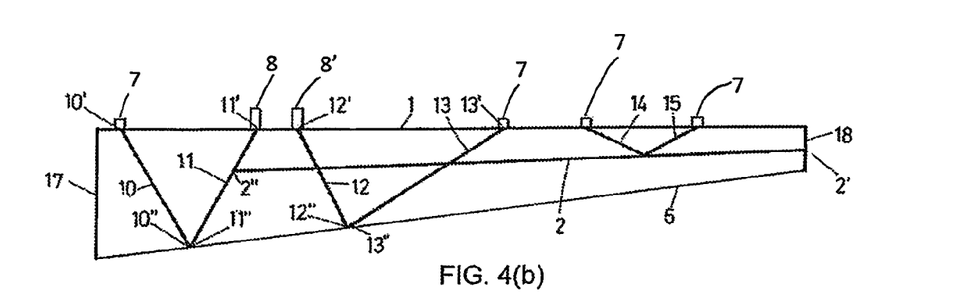
Figure 4C:
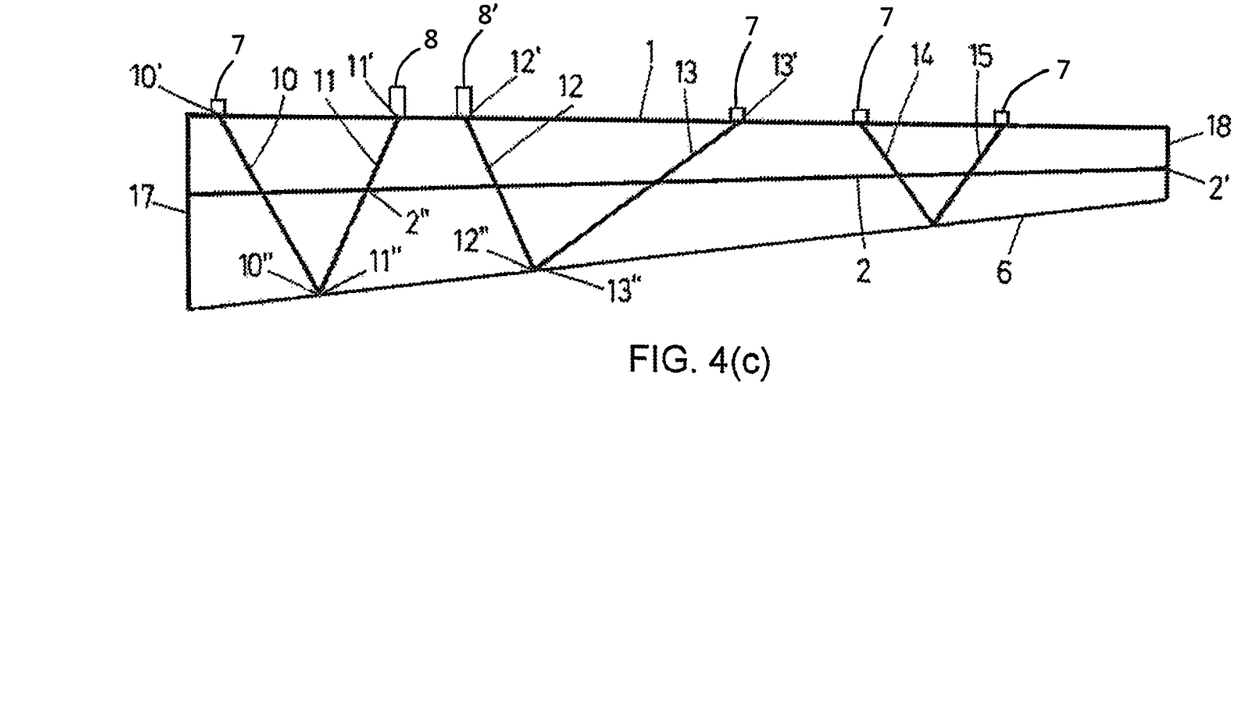

As it can be more clearly appreciated in FIG. 4(a)-4(c), according to the invention at least one of those ribs (10-15) is arranged so as to define an oblique angle ($\alpha$) or ($\beta$) with the front spar (1), hence, that rib is obliquely arranged with respect to the front spar (1).

Preferably, several of the ribs (10-15) of the control surface are obliquely arranged with respect to the front spar (1). More precisely, this oblique arrangement means that the longitudinal axis of each of the ribs, together with the longitudinal axis of the front spar (1), define on a plane, an oblique angle, that is, an angle different to 90°. In other preferred embodiments of the invention all the ribs of the control surface, except for the ribs located at the inboard and outboard ends (17, 18) of the control surface (9), are obliquely arranged.

Now turning to the exemplary embodiments of FIG. 4(a)-4(c), a first rib (10) has a front end (10') joined or connected to a first hinge fitting (7), and a second rib (11), adjacent to the first one, has a front end (11') joined to a first actuator fitting (8). Two oblique angles are defined between the first rib (10) and the front spar, a first acute angle ($\alpha$1) and a first obtuse angle ($\beta$1), both angles being supplementary to each other. Similarly to the first rib (10), the second rib (11) also defines two oblique and supplementary angles with respect to the first rib (10), namely a second acute angle ($\alpha$2) and a second obtuse angle ($\beta$2).

Additionally, according to the invention these two adjacent or consecutive ribs (10, 11) are inclined in opposite directions, so as to form a triangular shape together with the front spar (1).

The control surface (9) includes a second pair of adjacent ribs with a similar layout to the first pair. A third rib (12) has a front end (12') connected with a second hinge fitting (8') at the front spar (1) and a fourth rib (13), adjacent to the third rib, has a front end (13') joined with a second hinge fitting (14). Two oblique and supplementary angles ($\alpha$3, $\beta$3) are defined between the third rib (12) and the front spar (1), and two oblique and supplementary angles ($\alpha$4, $\beta$4) are defined between the fourth rib (13) and the front spar (1), wherein angles ($\alpha$3,$\alpha$4) are acute angles and angles ($\beta$3,$\beta$4) are obtuse angles. The inclination of the third and fourth ribs (12, 13) is opposed with respect to each other, so as to form a triangular shape together with the front spar (1) as was the case of the first pair of adjacent ribs.

Preferably, the first pair of adjacent ribs (10,11) have respectively rear ends (10", 11") joined with each other at the trailing edge (6), and the second pair of adjacent ribs (12, 13), also have their respective rear ends (12", 13") joined with each other at the trailing edge (6).

With this particular layout of the ribs according to the invention, the inclination of any two adjacent ribs alternate, so that one of said ribs is inclined towards the outboard end (18) and the other rib is inclined towards the inboard end (17) of the control surface. This inclined or diagonal arrangement of the ribs, has the additional effect that the ribs work as buckling stoppers for the upper and lower covers, thus avoiding the need for or reducing the number of stringers. This arrangement also provides an efficient load path for singular interface points such as actuators or supporting fittings, which are the main load introduction points of the control surface.

Preferably, the majority of the ribs of the control surface, and most preferably all the ribs of the same, except for the ribs located right at the inboard and outboard ends of the control surface, are obliquely arranged with respect to the front spar.

All the angles ($\alpha$1-$\alpha$4), ($\beta$1-$\beta$4) are different from each other. Preferably, any of the acute angles ($\alpha$1-$\alpha$4) is within the range 30° to 60°.

An additional feature of the invention is that all the ribs of the control surface, or at least the majority of the ribs, are grouped within an interior region (19) of the control surface where the upper and lower cover panels (not shown) are larger than in the rest of the control surface. This interior region extends from the inboard end (17) to an intermediate point between the inboard and outboard ends (17, 18) of the control surface (9). However, there are no ribs in an exterior region (20) which extends from the interior region (19) to the outboard end (18).

The control surface (9) additionally includes a rear spar (2) longitudinally arranged and located between the front spar (1) and a trailing edge (6) of the control surface. This rear spar (2) is shorter than the front spar (1) and it has an outboard end (2') connected with the outboard end (18) of the control surface, and an inboard end (2") located at a distance from the inboard end (17) where it is joined to one of the oblique ribs, with the second rib (2) in particular.

Due to the optimized layout of the ribs as described above, it is possible to reduce the length of this rear spar, which additionally contributes to the weight reduction of the structure and facilitates its assembly process. Furthermore, the shortened rear spar length and arrangement provides additional bending and torsion stiffness.

The control surface structure is optimized, since with a reduced number of components (ribs mainly) and/or with a shorter rear spar, it is capable of supporting the bending and torsion loads which appear on the control surface. The control surface structural design of the invention can be easily adapted to different geometrical characteristics and interface points with an aircraft.

As is apparent from the foregoing specification, the invention is susceptible of being embodied with various alterations and modifications which may differ particularly from those that have been described in the preceding specification and description. It should be understood that Applicant(s) wish to embody within the scope of the patent warranted hereon all such modifications as reasonably and properly come within the scope of the contribution to the art.

The invention claimed is:

1. An aircraft control surface that extends between an inboard end and an outboard end, the aircraft control surface comprising:
    a front spar arranged near a leading edge of the control surface,
    a rear spar arranged longitudinally and located between the front spar and a trailing edge of the control surface,
    at least one hinge fitting joined to the front spar,
    at least one actuator fitting joined to the front spar, and
    a plurality of ribs each having a front end joined with the front spar, wherein at least one rib of the plurality of the ribs, defined as a first rib, has its front end joined to a hinge fitting of said at least one hinge fitting and is arranged so as to define a first oblique angle with the front spar, and wherein at least another rib of the plurality of ribs, defined as a second rib, has its front end joined to one actuator fitting of said at least one actuator fitting,
    wherein the second rib is arranged so as to define a second oblique angle with the front spar, and
    wherein the rear spar extends only between the second rib and the outboard end of the aircraft control surface.

2. The aircraft control surface according to claim 1, wherein at least a pair of two adjacent ribs of the plurality of ribs are inclined in opposite directions with respect to each other.

3. The aircraft control surface according to any of the preceding claims, wherein any pair of two adjacent ribs arranged within an interior region of the control surface, are obliquely arranged with respect to the front spar in opposite inclinations, and wherein said interior region extends from the inboard end to an intermediate point between the inboard end and the outboard end of the control surface.

4. The aircraft control surface according to claim 2, wherein the rear spar has an outboard end joined with an outboard end of the control surface, and wherein the rear spar is shorter than the front spar.

5. The aircraft control surface according to claim 2, wherein each of the plurality of ribs has a rear end, and wherein at least a pair of two adjacent ribs have their rear ends joined with each other at a trailing edge.

6. The aircraft control surface according to claim 2, wherein at least one of the first oblique angle and the second oblique angle is within a range of 30° to 60°.

7. The aircraft control surface according to claim 2, further comprising upper and lower cover panels supported by said plurality of ribs.

8. The aircraft control surface according to claim 7, wherein at least a part of at least one of said front spar, said rear spar, said first rib, aid second rib, and said upper and lower cover panels, is made of a composite material.

9. The aircraft control surface according to claim 2, wherein the control surface is an elevator, or a rudder, or a flap, or an aileron.

10. The aircraft control surface according to claim 1, wherein, the rear spar has an outboard end joined with an outboard end of the control surface, and wherein the rear spar is shorter than the front spar.

11. The aircraft control surface according to claim 1, wherein each of the plurality of ribs has a rear end, and wherein at least a pair of two adjacent ribs have their rear ends joined with each other at the trailing edge of the control surface.

12. The aircraft control surface according to claim 1, wherein at least one of the first oblique angle and the second oblique angle is within a range of 30° to 60°.

13. The aircraft control surface according to claim 1, further comprising upper and lower cover panels supported by said plurality of ribs.

14. The aircraft control surface according to claim 13, wherein at least a part of at least one of said front spar, said rear spar, said first rib, said second rib, and said upper and lower cover panels, is made of a composite material.

15. The aircraft control surface according to claim 1, wherein the control surface is an elevator, or a rudder, or a flap, or an aileron.

16. The aircraft control surface according to claim 1, wherein the at least one actuator fitting includes a plurality of actuator fittings and the at least one hinge fitting includes a plurality of hinge fittings, and further wherein the plurality of ribs each have one of their first ends joined to one of the actuator fittings or to one of the hinge fittings, and still further wherein at least a pair of two adjacent ribs are inclined in opposite directions with respect to each other.

17. The aircraft control surface according to claim 1, wherein:
    any pair of two adjacent ribs arranged within an interior region of the control surface, are obliquely arranged with respect to the front spar in opposite inclinations, and wherein said interior region extends from the inboard end to an intermediate point between the inboard end and the outboard end of the control surface,
    each of the plurality of ribs has a rear end,
    an exterior region of the control surface is defined as a part of the control surface not being the interior region, and
    all pairs of adjacent ribs within the interior region have rear ends joined to the trailing edge and all pairs of adjacent ribs within the exterior region have rear ends joined to the rear spar.

18. An aircraft control surface that extends between an inboard end and an outboard end, the aircraft control surface comprising:

a front spar arranged near a leading edge of the control surface, a rear spar arranged longitudinally and located between the front spar and a trailing edge of the control surface, at least one hinge fitting joined to the front spar, at least one actuator fitting joined to the front spar, and a plurality of ribs each having a front end joined with the front spar, wherein at least one rib of the plurality of the ribs, defined as a first rib, has its front end joined to a hinge fitting of said at least one hinge fitting and is arranged so as to define a first oblique angle with the front spar, and wherein at least another rib of the plurality of ribs, defined as a second rib, has its front end joined to one actuator fitting of said at least one actuator fitting, wherein the second rib is arranged so as to define a second oblique angle with the front spar, wherein any pair of two adjacent ribs arranged within an interior region of the control surface, are obliquely arranged with respect to the front spar in opposite inclinations, and wherein said interior region extends from the inboard end to an intermediate point between the inboard end and the outboard end of the control surface, wherein each of the plurality of ribs has a rear end, wherein an exterior region of the control surface is defined as a part of the control surface not being the interior region, and wherein all pairs of adjacent ribs within the interior region have rear ends joined to the trailing edge and all pairs of adjacent ribs within the exterior region have rear ends joined to the rear spar.

\* \* \* \* \*